May 27, 1941.　　　　　L. ROTTER　　　　　2,243,776
FUR CUTTING MACHINE
Filed May 22, 1939　　　　　7 Sheets-Sheet 4
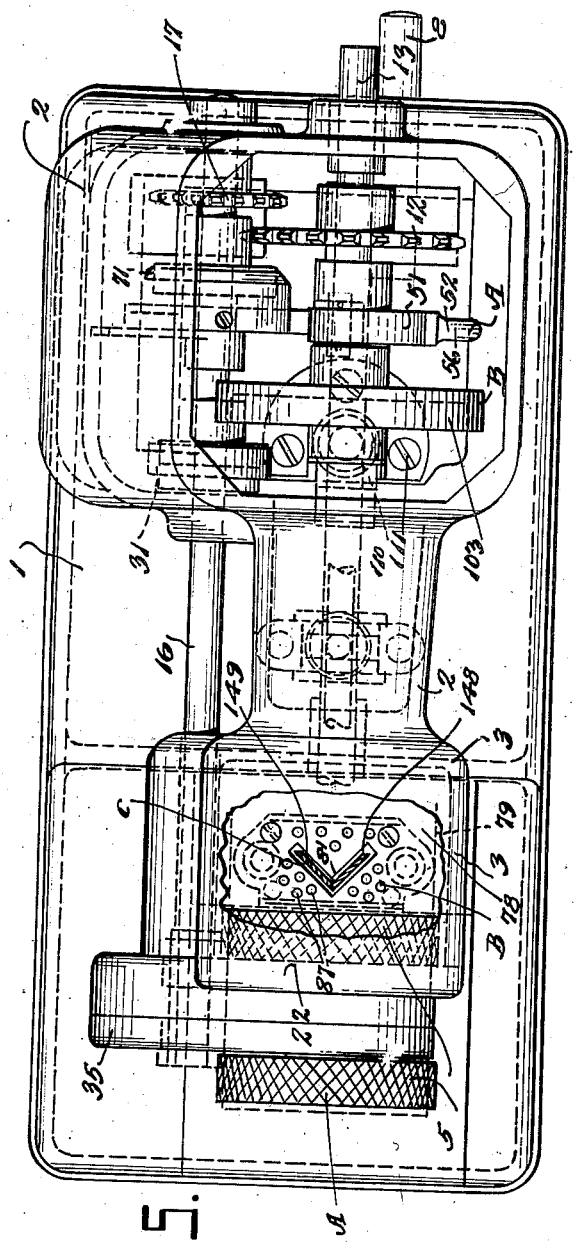
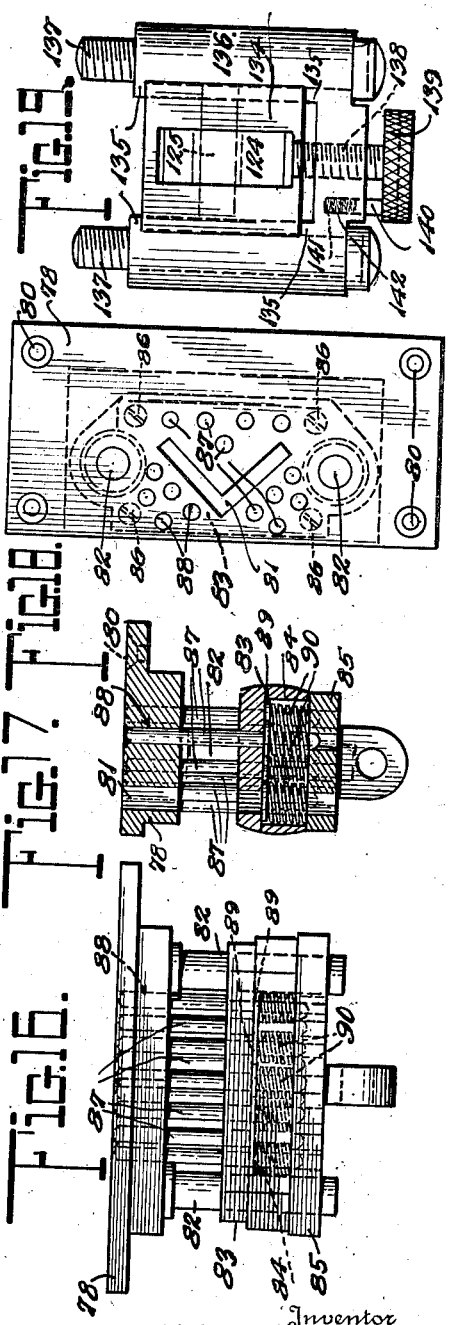
Inventor
L. Rotter
By Robt R Robb
Attorneys

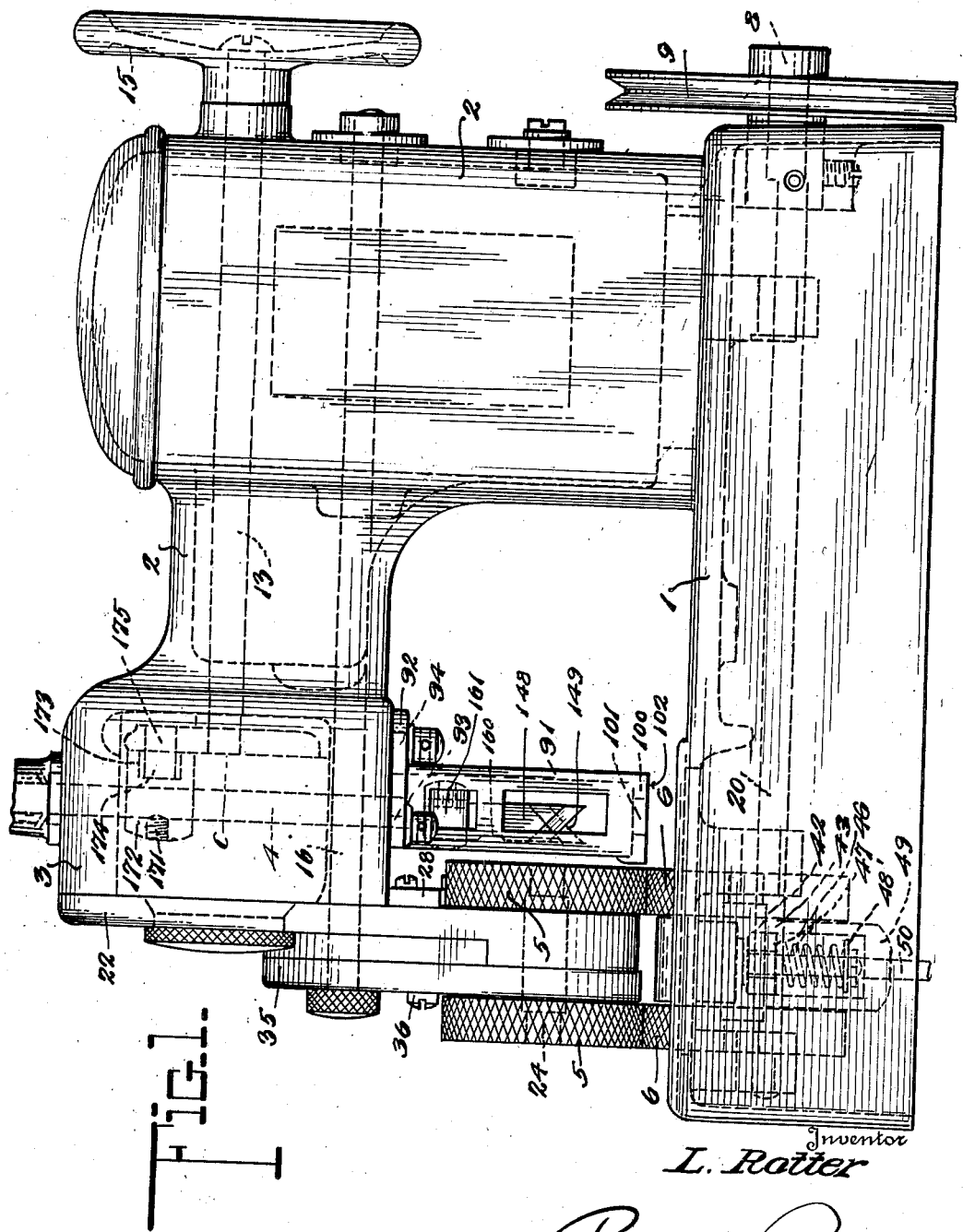

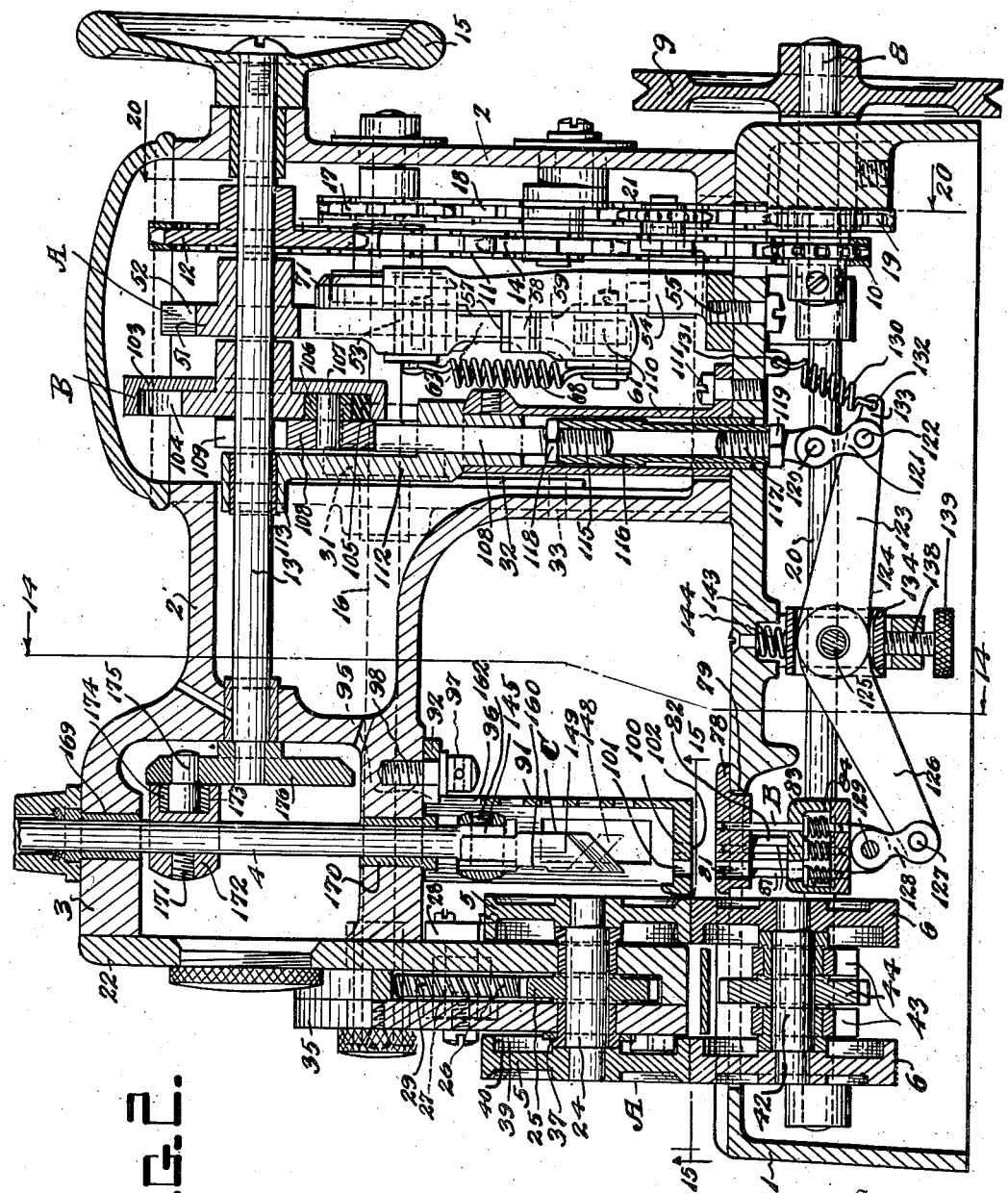

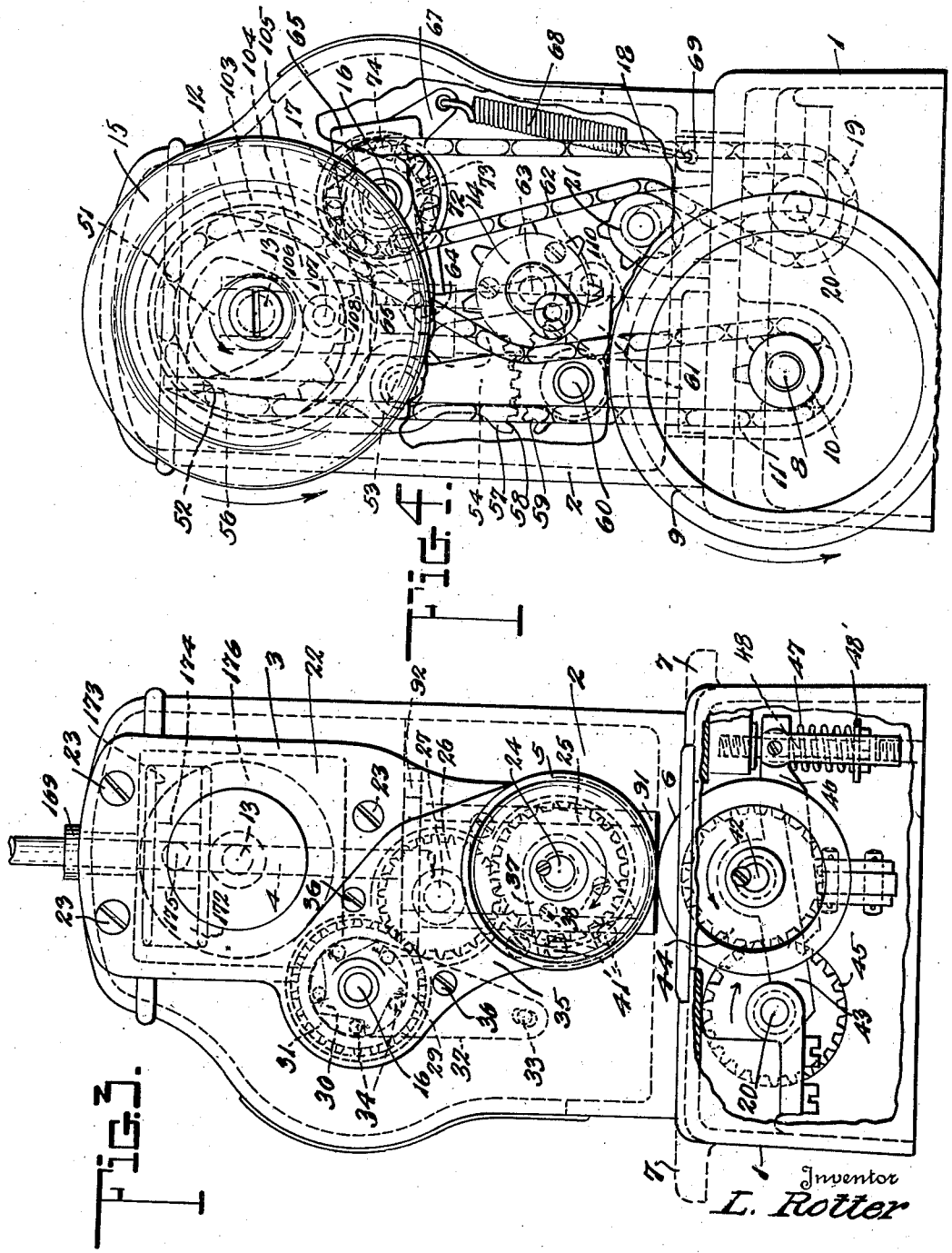

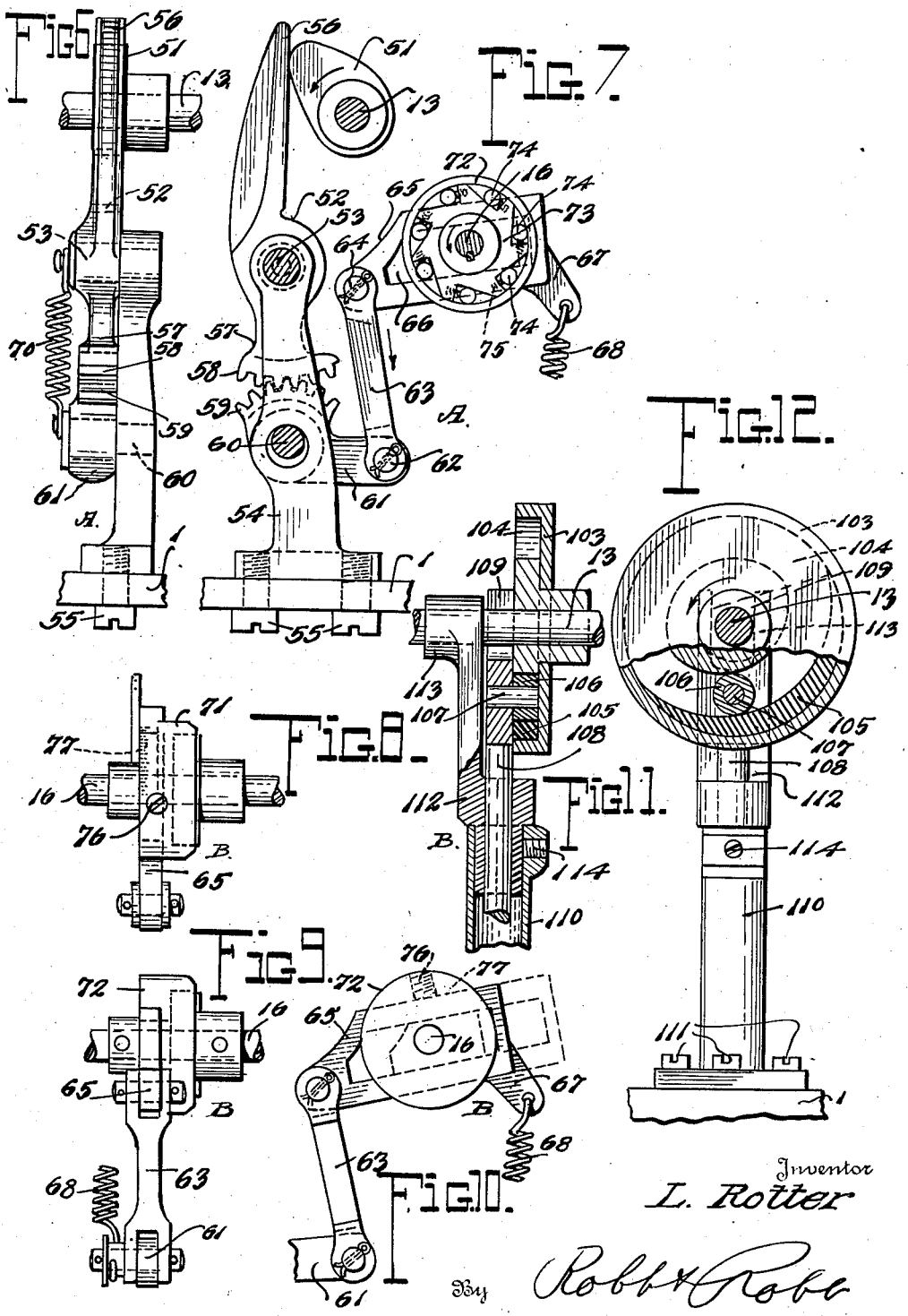

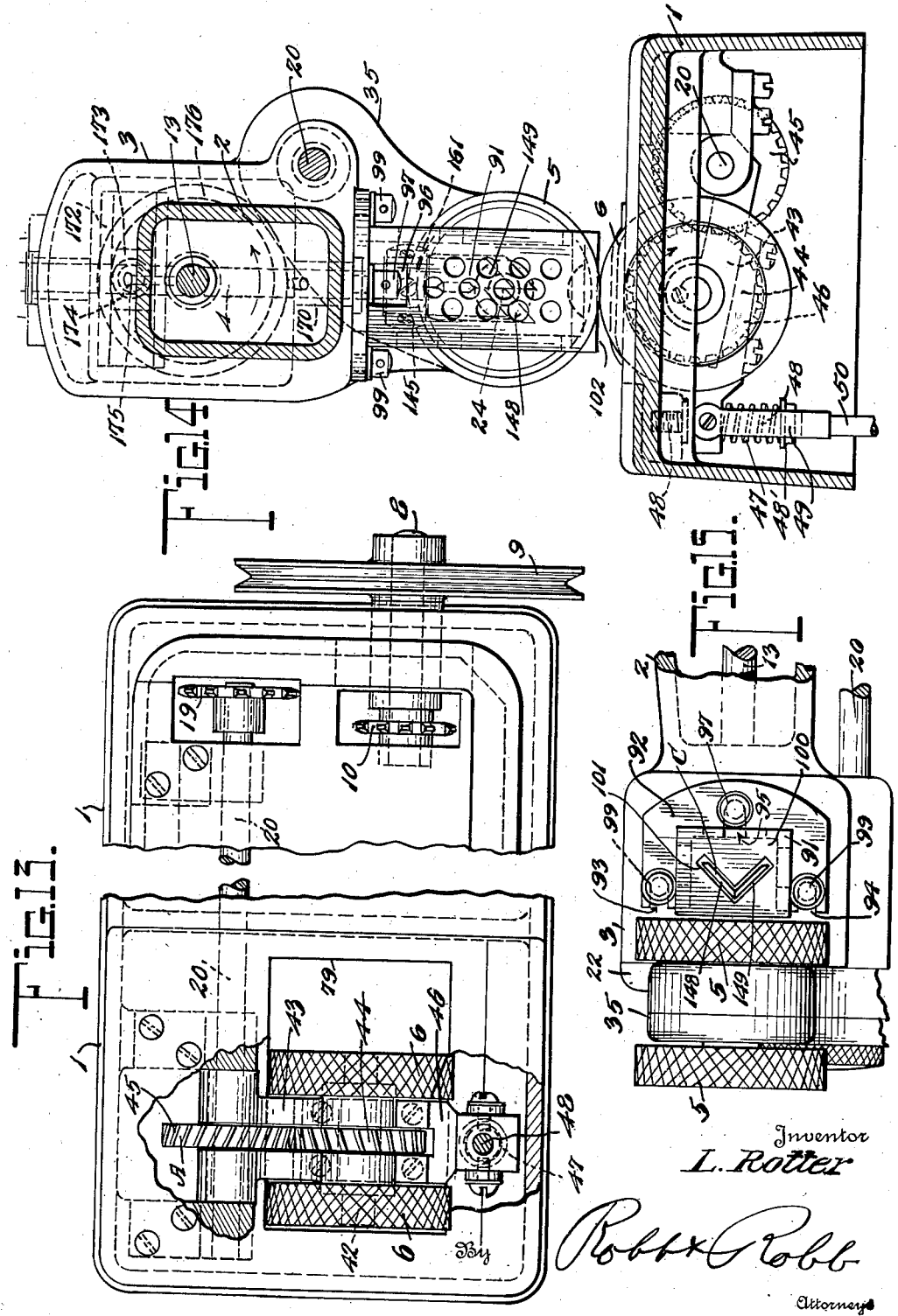

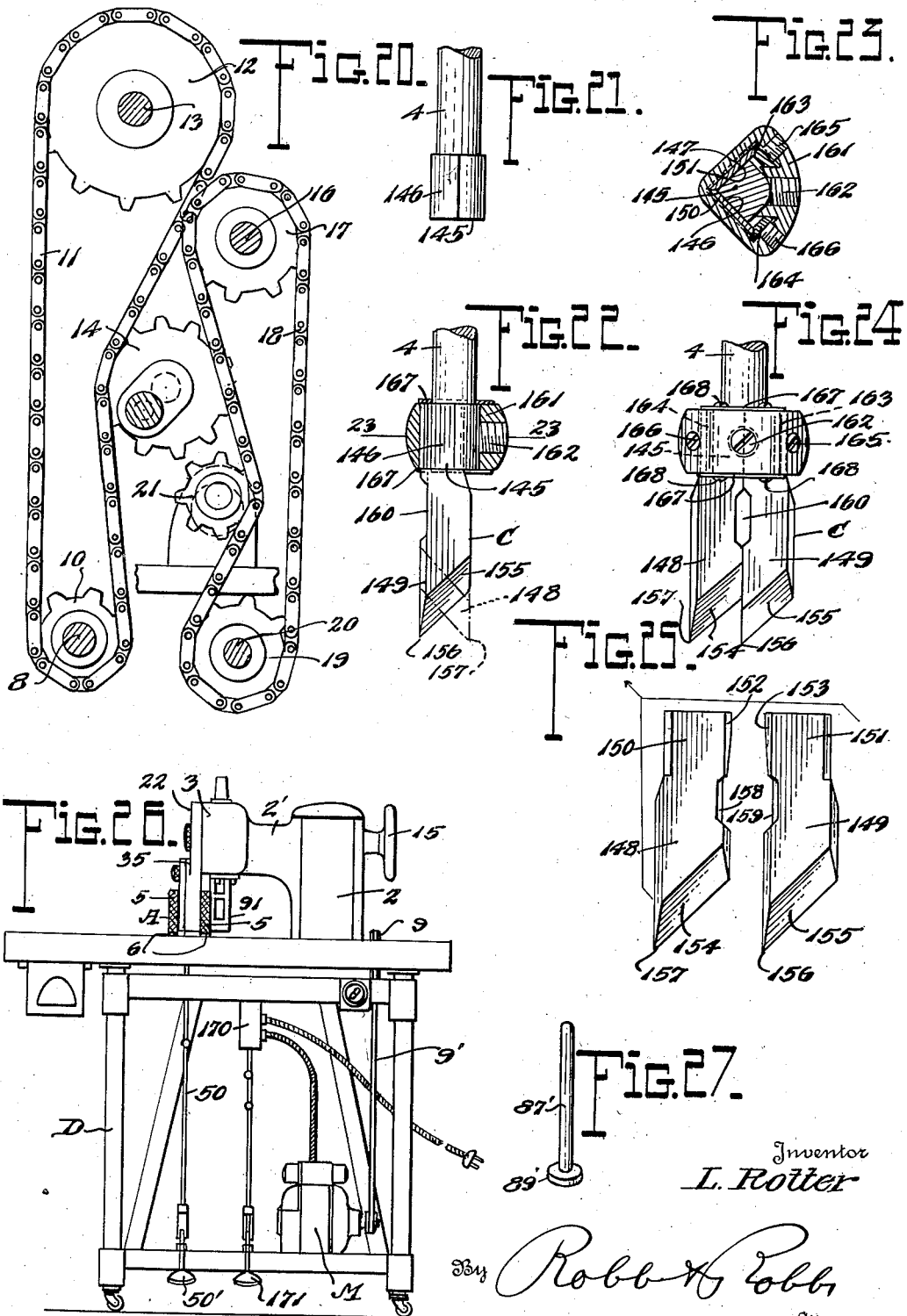

Patented May 27, 1941

2,243,776

UNITED STATES PATENT OFFICE 2,243,776

FUR CUTTING MACHINE

Louis Rotter, Cambridge Springs, Pa.

Application May 22, 1939, Serial No. 275,060

20 Claims. (Cl. 164—50)

This invention appertains to improvements in fur cutting machines, and more especially, to an improved machine by which zig-zag cuts of indefinite length may be continuously and accurately produced.

For many years, it has been the practice in the fur garment industry to join together separate pieces of fur by first cutting or trimming the fur along a zig-zag line to produce a uniformly serrated edge on each piece of fur. Thereupon, the serrated edges of the fur pieces are matched together and sewed in any suitable manner to permanently join the pieces together. Due to the zig-zag form of the cuts and seam, the seam is more effectively concealed and the matching of the fur is facilitated, without producing any sharp line of demarcation at the juncture of the separate fur pieces.

In the past, the cutting or trimming operations have been primarily performed by hand even though a number of different types of machines have been proposed to produce zig-zag cuts. The failure of the industry to adopt such machines is largely attributed to the inaccuracies of the machines which result in part from their inability to compensate for variations in thickness of the fur, lack of positive feed, and the improper design of the cutting instrumentalities.

One of the primary objects of the present invention is to provide a fur cutting machine, preferably of the power operated type, which is rugged and compact and which embodies improved feeding, clamping and cutting instrumentalities, each operating in timed relation to the other, to the end that a continuous and uniform zig-zag cut may be produced without requiring any special skill on the part of the operator of the machine.

A further object of the invention is to provide a novel feeding mechanism by which the fur is intermittently fed through the machine without slippage, so that the successive cuts produced by a reciprocating cutter will be even and accurately spaced along a continuous zig-zag line.

A still further object of the invention is to provide an improved feeding mechanism which will automatically accommodate furs of different thicknesses and which is substantially unaffected by variations in thickness of the same piece or fur as the piece is progressively fed through the machine, the feeding mechanism being also so constructed and arranged as to enable the fur to be conveniently introduced in and removed from the machine, and allowing the cut to be started and terminated at any point either at or short of the ends of the fur.

Another object of the invention is to provide a feeding mechanism which is so constructed that the fur will be restrained against lateral shifting during the feeding operation.

My invention further contemplates the provision of a novel clamping mechanism by which pressure is yieldably and independently applied to the fur at a plurality of points at opposite sides of the line of cut and in such manner that the hairs will not be cut during the cutting of the skin. The clamping mechanism is also constructed so that it offers no resistance to or interference with the feed of the fur by the feeding mechanism.

Still another object of the invention is to provide an improved cutting mechanism of the reciprocal type, the cutting mechanism including cutters of improved design and a novel mounting therefor which permits convenient removal of the cutter blades for sharpening or replacement.

Another object of the invention is to provide novel driving instrumentalities for the respective feeding, clamping and cutting mechanisms and by which these mechanisms are operated in the proper timed relation to each other.

Other and further objects and advantages of the invention will be hereinafter set forth, and the novel features thereof defined by the appended claims.

In the drawings:

Figure 1 is a view of my improved fur cutting machine (except the table, motor, and certain of the controls) in side elevation;

Figure 2 is a vertical longitudinal sectional view, certain of the parts being omitted;

Figure 3 is a view in elevation of the front or operating end of the machine, which is the left-hand end in Figures 1 and 2, parts of the machine being broken away and shown in section in Figure 3;

Figure 4 is an elevation of the end of the machine opposite to that shown in Figure 3, parts being broken away;

Figure 5 is a top plan view with the rear cover plate removed from the machine and a portion being broken away to show the plunger pin carrying plate of the clamping mechanism on the bed, with its knife receiving slot;

Figures 6 and 7 are detail elevations at right angles to each other, showing the upper feed roll actuating mechanism;

Figure 8 is a top plan view of the one-way clutch and its actuating instrumentalities which form parts of the feed roll actuating mechanism of Figures 6 and 7;

Figure 9 is an elevation of the parts shown in Figure 8;

Figure 10 is a side view of the parts shown in Figure 9;

Figure 11 is a vertical sectional view through the cam actuating device for the clamping mechanism;

Figure 12 is a side elevation of the parts shown in Figure 11, portions thereof being broken away and shown in section;

Figure 13 is a fragmentary plan view of the bed of the machine, parts being broken away to show the lower feed rolls;

Figure 14 is a vertical sectional view, taken on the line 14—14 of Figure 2 with the lower group of the fur-clamping parts omitted for the sake of clarity;

Figure 15 is a horizontal sectional view, taken on the line 15—15 of Figure 2;

Figure 16 is a detail view of the lower group of the fur clamping instrumentalities;

Figure 17 is a transverse vertical sectional view of the fur clamping instrumentalities shown in Figure 16;

Figure 18 is a top plan view of the clamping instrumentalities shown in Figures 16 and 17;

Figure 19 is a detail view of the adjustable mounting for the actuating lever which actuates the clamping instrumentalities;

Figure 20 is a somewhat diagrammatic view showing the arrangement of the driving chains, and taken approximately on the plane 20—20 of Figure 2;

Figure 21 is a side view of the lower end of the cutter bar;

Figure 22 is a detail view, partly in section and partly in elevation, showing the cutter blades and retaining clamp mounted on the lower end of the cutter bar;

Figure 23 is a horizontal sectional view, taken approximately on the line 23—23 of Figure 22;

Figure 24 is an elevation of the lower portion of the cutter bar and cutter blade assembly;

Figure 25 is a detail view illustrating the disassembled complemental cutter blades in elevation;

Figure 26 is a view in elevation of the cutting fur machine mounted upon a portable stand and showing the motor, its controls and the fur-releasing control; and Figure 27 is a detail perspective view of a modified form of pressure pin which may be substituted for the form shown in Figures 16 and 17.

Like reference characters designate corresponding parts in the several figures of the drawings.

In general, my improved machine may be said to comprise feeding mechanism designated A, clamping mechanism designated B and cutting mechanism C, the same being mounted in operative relation to each other and actuated in timed relation. For convenience, these mechanisms will be separately described in detail hereinafter. As will be understood from reference to the drawings, the machine as a whole has the general appearance of a sewing machine in that it includes a base 1 and a frame 2 extending upwardly from the base at one end, the frame being hollow and forming a housing for certain of the working parts of the machine, more especially the driving instrumentalities. The frame is extended laterally at 2' in overhanging relation to the base 1, and terminates in a head 3 which carries a reciprocating cutter bar 4. Suspended from the head 3 is an upper pair of spaced feed rolls 5, 5, and mounted in the base 1 is a lower pair of spaced feed rolls 6, 6. The clamping instrumentalities B are also mounted in the base 1, the latter being preferably so constructed as to be conveniently attachable to a table or supporting stand D. As illustrated in dotted lines in Figure 3, the base 1 may be provided with off-standing lugs 7 to facilitate and simplify the attachment of the machine to a stand.

Journaled in one end of the base is a drive shaft 8 which may be driven from any suitable source of power, such as by an electric motor M connected by a belt 9' to the pulley 9 fixed to the outer end of the shaft 8. The inner end of the drive shaft 8 is provided with a sprocket 10, which is fixed thereon for rotation therewith, and the sprocket 10 is connected by a chain 11 to a sprocket 12 fixed on a shaft 13 journaled in the upper end of the frame 2 and its extension 2' and disposed parallel to the drive shaft, as clearly shown in Figure 2. An adjustable idler sprocket 14 serves to take up slack in the chain 11. The shaft 13 constitutes the main operating shaft of the machine from which power is transmitted to the respective operating parts, to wit, the respective feed, clamping and cutting mechanisms A, B and C. Fixed to the outer end of the shaft 13 is a handwheel 15, by means of which the shaft 13 may be conveniently turned by hand or stopped quickly by the application of pressure of the hand on the wheel 15. The wheel 15 also acts as a flywheel.

Also journaled in the frame 2 and disposed parallel to the shaft 13 somewhat to the rear thereof and below the same, is another shaft 16 which extends beyond the front end of the head 3. This shaft 16 is operatively connected to the upper feed rolls 5, 5 and to the lower feed rolls 6, 6, the connection to the latter being effected through means of a sprocket 17 fixed on the shaft 16 and interconnected by a chain 18 to a sprocket 19 fixed to a shaft 20 journaled in the base 1. An adjustable idler sprocket 21 mounted within the frame 2 serves to take up slack in the chain 18. The end of the shaft 20 opposite to the sprocket 19 is operatively connected to the lower rolls 6, 6.

*Feeding mechanism*

More specifically describing the feeding mechanism and having particular reference first to Figures 1 and 5, it will be seen that the front end of the head 3 is provided with a cover plate 22 which is fastened thereto, as by means of the screws 23, and closes the space within the head 3. The plate 22 extends substantially below the head and supports the upper feed rolls 5, 5 which are arranged in spaced relation to each other on a short shaft 24. One of the rolls 5 is disposed in back of the plate 22 and contiguous to the cutting instrumentalities C, and at the front of the plate 22 and fixed to the shaft 24 is a gear 25 which meshes with an adjustable idler gear 26 rotatably mounted on a stub shaft 27 extending through the plate 22 and adjustably fixed to the rear side thereof, as at 28. The idler gear 26 meshes with another gear 29 fixed on the forward end of the shaft 16 at the front of the plate 22. Provision is preferably made for limiting rotation of the upper gear 29 to one direction, and to this end, a one-way clutch device is associated with the shaft 16 to permit free rotation in the direction of the arrow in Figure 3 while positively prohibiting rotation in the opposite direction. This one-way clutch device comprises a notched disc member 30 fixed to the shaft 16 for rotation therewith and a stationary annular member 31 extending about the notched member 30, the annular member being carried by an arm 32 fixed to the frame 2, as at 33. A series of small rollers 34 is interposed between the notched member 30 and the fixed member 31. It will be understood from reference to Figure 3 that when the notched member 30 is rotating with the shaft 16 in the direction of the arrow, the rollers 34 will be disposed in the deep portions of the respective notches which are so proportioned as to afford sufficient clearance between the rollers and the annular member 31 as to allow free rotation of the member 30 and the shaft 16. However, should a force be applied to the shaft 16 in a direction tending to reverse the rotation of the shaft, the rollers 34 will be wedged against the annular member 31, thereby locking the shaft 16 against rotation in such opposite direction.

A cover plate 35 is attached by screws 36 to the plate 22, and serves to enclose the gears 25, 26 and 29, and the shaft 24 is also extended through and journaled in the cover plate 35. The other roll 5 of the upper pair is fixed to the outer end of the shaft 24, and the two rolls 5, 5 are rotated together as a unit through the gear train above described. The common axis of the two upper rolls 5, 5 and shaft 24 lies in an imaginary vertical plane passing through the vertical axis of the reciprocating cutter bar 4, and the lower extremities of the rolls 5, 5 are spaced above the base or bed 1 of the machine, as clearly shown in Figures 1, 2 and 3.

While provision is preferably made for adjusting the position of the intermediate idler gear 26, as previously described, to compensate for wear and maintain the backlash of the gears at a minimum, there will nevertheless be a slight amount of looseness or play in the gear train even when the adjustment is made to obtain a smoothly working assembly. Any backlash or looseness, however small, might seriously impair the accuracy of the feed of the rollers, and accordingly there is preferably provided another one-way clutch in association with one of the upper rollers 5. As shown in Figures 2 and 3, there is attached to the outer side of the gear casing or cover 35 a plate segment 37, the attachment being effected by means of the screws 38 which hold the segment stationary. The outer roll 5 is provided with a recess 39 in its rear side, and the segment 37 is received in this recess. The segment 37 extends radially towards the annular lip 40, terminating just short of engagement therewith, and the segment is notched to receive a plurality of rollers 41 which normally lie in the deep portions of the notches so as to allow free rotation of the roll 5 in the direction of the arrow in Figure 3. The position of the segment 37 and rollers 41 is such that the rollers 41 tend to move towards the shallow ends of the notches in the segment 37 by the influence of gravity, so that immediately upon interruption of rotation of the rolls 5, 5, or upon any application of force tending to rotate the rolls 5, 5 in a direction opposite to the direction of the arrow in Figure 3, the small rollers 41 will wedge themselves between the segment 37 and the overhanging annular lip 40 at the back of the outer roll 5, thereby locking the rolls 5, 5 against rotation in such opposite direction.

The lower feed rolls 6, 6 are substantially counterparts of the upper rolls 5, 5, and are likewise positively driven at the same speed but in the opposite direction, as indicated by the arrow in Figure 3. Referring particularly to Figures 1 to 3, 13 and 14, it will be seen that the lower rolls 6, 6 are fixed to a shaft 42 which is journaled in a pivotal arm 43 mounted for swinging movement about a horizontal axis coinciding with the axis of the shaft 20. Fixed to the shaft 42 intermediate the rolls 6, 6 is a gear 44 which meshes with a gear 45 fixed on the outer end of the shaft 20. Due to this arrangement, the rolls 6, 6 are free to swing towards and away from the upper rolls 5, 5 without disturbing or interfering with the meshing relation of the gears 44, 45. The free end of the pivotal lever 43 is connected to an extension arm 46, and the free end of the arm 46 is engaged by a compression spring 47 encircling a guide post 48 attached to and extending vertically downwardly from the bed of the machine, through the end of the arm 46. The lower end of the spring 47 abuts against a seat 48 which is preferably adjustable on the lower end of the post 48 and the upper end of the spring bears against the under side of the arm 46, thereby normally yieldably urging the rolls 6, 6 towards the upper rolls 5, 5.

Pivotally connected to the free end of the arm 46 is a yoke 49, which is in turn connected to an actuator rod 50 to which vertical movement is adapted to be imparted in any suitable manner, as by means of a pedal 50' or the like, (Fig. 26). Thus by pulling downwardly on the rod 50, the arm 46 and pivotal lever 43 will be urged downwardly against the force of the spring 47, and the lower pair of rolls 6, 6 will be moved downwardly away from the upper rolls 5, 5, enabling the fur to be operated upon by the machine to be introduced between the feed rolls and manipulated freely to the proper position for starting the cutting operation. Upon release of the rod 50, the spring 47 will urge the lower rolls 5, 5 upwardly to yieldingly grip the fur between the upper and lower pairs of rolls and condition it for positive feeding or advancement through the machine incident to actuation of both pairs of rolls. Due to the fact that both the upper rolls 5, 5 and the lower rolls 6, 6 are positively driven, with the rolls yieldingly gripping the fur at two spaced points at one side of the line of cut, the feeding action will be more positive and slippage will be prevented. Also, the fur will be fed in a straight path through the machine, thus minimizing lateral shifting or drifting of the fur to one side or the other during the cutting operation.

Due to the arrangement of the lower feed rolls 6, 6 to permit their movement away from the upper feed rolls 5, 5 under the control of the actuator rod 50, the removal of the fur from the machine, where the cut is stopped short of the end of the fur, is greatly facilitated, as will be obvious from the foregoing description.

*Feed roll drive*

In the foregoing, it has been pointed out that the upper feed rolls 5, 5 are operatively connected to the shaft 16 and the lower feed rolls 6, 6 are operatively connected to the shaft 20, and shafts 16 and 20 are interconnected by the sprocket and chain means 17, 18 and 19. It will now be explained in detail how power is applied to the shafts 16 and 20. Before entering into this description, it is to be understood that the rolls 5, 5 and 6, 6 are intermittently operated so as to advance the fur through the machine step by step. The fur is cut while the feed rolls and fur are stationary.

Referring now to Figures 6 to 10, inclusive, 51 designates a cam fixed to the main power shaft 13, the same being normally continuously rotated in the direction of the arrow in Figure 7. Coacting with the cam 51 is a lever 52 pivotally mounted at 53 on a standard 54 which is secured by bolts 55 to the bed 1 of the machine and extending upwardly within the frame 2. The lever 52 is extended generally in an upward and downward direction at opposite sides of the pivot 53, providing an upper arm 56 for engagement with the cam 51, and a lower arm 57 which terminates in the form of a gear segment 58. The gear segment 58 meshes with another gear segment 59 which is pivotally mounted at 60 on the standard 54. This pivotal connection 60 preferably has the form of an eccentric pin rotatably adjustable in the standard 54 to permit adjustment of the backlash of the gear segments 58, 59. The gear segment 59 is provided with an offset arm 61 which is pivotally connected at 62 to the lower end of a link 63. The upper end of the link 63 is pivotally connected at 64 to a slotted plate or link 65. The slot 66 in the link or plate 65 straddles the shaft 16 so that the link 65 may be said to rock about the axis of the shaft 16. Fixed to the end of the slotted link 65 opposite to the link 63 is an arm 67, to which one end of a tension spring 68 is connected, the other end of the spring 68 being attached to any convenient point within the frame of the machine, as shown at 69 in Figure 4. A tension spring 70, having one end connected to the pivot 53 and its other end to the pivot 62, normally serves to yieldably urge the arm 56 of the lever 52 into engagement with the cam 51. Thus as the cam 51 rotates in the direction of the arrow in Figure 7, the arm 56 will be urged in a counter-clockwise direction, causing movement of the arm 61 in a downward direction, this movement being transmitted through the link 61 to the slotted link or plate 65 and resulting in a counter-clockwise movement of the part 65 about the axis of the shaft 16.

The slotted member 65 is operatively connected to the shaft 16 by a one-way clutch which includes a part 71, loosely mounted on the shaft 16, and having an annular flange or lip 72 disposed concentric with the shaft 16 at one side of the part 71. The member 65 is inserted by means of a tenon and recess into the opposite side of the part 71 so that as the member 65 is rocked responsive to operation of the cam 51, the part 71 will be correspondingly rocked in the same direction. Fixed to the shaft 16 and disposed within the annular ring or lip 72 of the member 71 is a notched disc member 73. A series of small rollers 74 is disposed in the notches in the part 73, as clearly shown in Figure 7. Light springs 75, each having an end seated in a socket in the notched member 73 and its opposite end engaged with a roller 74, serve to normally urge the respective rollers towards the shallow ends of the notches in which the rollers are disposed. Accordingly, as the member 65 and ring 72 move in a counter-clockwise direction, as previously described, and as indicated by the arrows in Figure 7, the rollers 74 will be wedged between the ring 72 and the notched member 63, thereby transmitting motion in a counter-clockwise direction to the notched member 73. Since the part 73 is secured to the shaft 16, the shaft will be consequently rotated in a counter-clockwise direction. As the cam 51 recedes, the tension spring 68 comes into play and urges the member 65 and the parts interconnected therewith in the opposite direction from that just described, and during this reverse movement, the rollers 74 will be yieldingly urged towards the deep ends of the notches in the part 73, and no movement will be imparted to the shaft 16. To prevent the friction of the parts from possibly causing a reverse movement of the shaft 16 during the reverse (clockwise) movement of the slotted plate or link 65, the one-way clutch instrumentalities 30, 31, 34, etc. (Figure 3), previously described, are arranged in opposed relation to the corresponding one-way clutch instrumentalities shown in Figure 7.

From the foregoing, it will be understood that as the cam 51 is continuously rotated by the shaft 13, the shaft 16 will be intermittently rotated in one direction only, thereby transmitting intermittent rotation to the upper rolls 5, 5 and also to the lower rolls 6, 6 between which the fur is adapted to be fed. Provision is preferably made for adjusting the degree of rotation of the shaft 16, whereby to permit variation in the step-by-step feed of the fur. To this end, the slotted link or plate 65 is adjustable relative to the part 71, as clearly shown in Figure 10, in which the full-line position of the link 65 represents the limit of adjustment in one direction, and the dotted line position the limit of adjustment in the other direction. A set screw 76 having threaded engagement with the member 71 normally bears against the upper edge of the link 65, which is recessed in the back of the part 71, thereby rigidly securing the link 65 and part 71 together. By loosening the set-screw 76, the relative adjustment of these parts as described above can be conveniently made. To aid in the adjustment, a graduated scale 77 is preferably provided on the upper edge of the link 65, so that as the link is adjusted towards its dotted line position shown in Figure 10, the graduations will be progressively brought into view. When the distance between the axis of the pivot 64 and the axis of the shaft 16 is greatest, the degree of rotation of the shaft 16 per stroke of the cam 51 will be the smallest, and when the distance between the axis of the pivot 64 and the axis of the shaft 16 is smallest, the degree of rotation of the shaft 16 per stroke will be the greatest. This adjustment permits the adaptation of the machine to cut different sizes of zig-zags in the fur. In practice, I have found that a variation from three-quarters inch to one and one quarter inch from point to point in the zig-zag cut is normally sufficient and the graduated scale 77 may be marked accordingly.

*Clamping mechanism*

Referring now to Figures 2 and 16 to 18, inclusive, the clamping mechanism generally designated B includes a plate 78 fixedly secured over an opening 79 in the base or bed 1 of the machine, the plate being provided with openings 80 for receiving attaching screws or other fastening instrumentalities by which the plate may be removably secured to the base. Formed in the plate about midway between its opposite ends is a V-shaped slot 81, generally corresponding to the shape of the cut and in register with the cutting instrumentalities carried by the reciprocal cutting bar 4. Depending below the plate 78 and carried thereby is a pair of guides 82, upon which a carrier 83 is mounted for movement in an upward and downward direction. The carrier is preferably made in two parts, the upper part of which is provided with a recess 84 in its lower side, across the open side of which a plate 85 is removably disposed through the aid of fastening screws 86. Loosely mounted in the carrier is a plurality of elongated pins 87 disposed with their axes vertical and guided in apertures formed in the upper and lower parts 83 and 85 of the carrier, as clearly shown in Figures 2 and 17. The upper extremities of the pins 87 are loosely received in apertures 88 formed in the plate 78 and corresponding to the arrangement of the pins. The preferred arrangement of the pins is clearly shown in Figure 18, but it is understood that I do not wish to be limited to this precise arrangement, as the same may be changed as desired. Each pin 87 is provided near its lower end with an annular collar or flange 89 disposed in the recess 84 in the carrier and serving to limit the upward movement of the pin relative to the carrier. Encircling each pin is a coil spring 90, having its upper end abutting against the lower side of the collar or flange 89, and its lower end abutting against the lower plate 85 of the carrier. The springs serve to normally urge the pins 87 in an upward direction, with the collars or flanges 89 normally pressed into engagement with the base of the recess 84. It will be obvious, however, that each pin is yieldably depressible independently of every other pin.

In Figure 27, there has been shown a modified form of pressure pin 87' which may be substituted for the pins 87 above referred to, the primary difference residing in the omission of any shank below the flange 89' which is adapted to be yieldably engaged by the pressure springs as in the arrangement first described. If desired, provision may be made in any suitable manner to adjust the pressure of the individual springs 90, or springs of different compressive strength may be interchanged at will.

Disposed above the plate 78 in spaced relation thereto is a member 91 which is generally U-shaped in horizontal cross-section. This member 91 substantially encloses the cutting instrumentalities C on the lower end of the cutter bar 4 and acts as a guard therefor, the open side of the member 91 being disposed towards the adjacent upper feed roll 5, as clearly shown in Figure 2. At the upper end of the guard member 91, there is provided a flange 92 extending laterally outwardly at three sides thereof and serving as an attaching flange by which the guard may be releasably mounted on the bottom of the head 3. As shown in Figures 2, 14 and 15, the flange 92 is notched at 93, 94 and 95, each notch facing in the same direction (to the left as viewed in Figures 2 and 15), and the notch 95 leading at its open side to an aperture 96 formed in the contiguous vertical wall of the guard. The opening 96 is of sufficient size to permit the head 97 of an attaching screw 98 to freely pass therethrough when the screw is loosened to release the attaching flange 92 which is normally clamped between the screw head 97 and the bottom of the head 3 of the frame. Additional attaching screws 99, 99 extending through the respective notches 93, 94 into the bottom of the frame head 3 cooperate with the screw 98 to releasably secure the guard 91 on the machine, and by virtue of the arrangement of the notches and the opening 96, the guard 91 may be removed from the machine in an obvious manner, without necessitating complete removal of the screws 98, 99.

The walls of the guard are preferably apertured, as shown in Figure 2, to permit observation of the cutting instrumentalities. At the bottom of the guard 91, there is provided a horizontal flange or shelf 100 which extends across the guard directly in the path of the cutting instrumentalities C, and a V-shaped slot 101 is formed in the flange or shelf 100, corresponding to the opening 81 in the plate 78, and exactly in register therewith. The bottom face 102 of the shelf or flange 100 is flat, and is disposed approximately at the same elevation as the lower extremities of the upper feed rolls 5, 5, which, as previously explained, are arranged in spaced relation to the base or bed 1 of the machine.

In the operation of the clamping instrumentalities B, the fur is clamped between the upper extremities of the yieldably mounted pins 87 and the lower face 102 of the shelf or flange 100. The fur is fed through the machine by the feed rolls 5, 5 and 6, 6 with the skin side uppermost, and the pins 87 will therefore engage the side of the fur which has the hair projecting therefrom. During the actual movement of the fur through the machine as it is intermittently fed by the feed rolls, the carrier 83 for the pins 87 is disposed in a depressed or lowered position, as illustrated in Figure 2, with the pins 87 retracted below the upper side of the plate 78. Thus the clamping instrumentalities B, and more especially the pins 87, will not interfere with or offer any resistance to the movement of the fur during its feeding action. Between each step of the feeding operation effected by the intermittent actuation of the feed rolls, there is a brief time when the fur remains stationary, and it is during this stationary interval that the clamping instrumentalities B are actuated to clamp the fur. The clamping operation is accomplished by elevation of the carrier 83, causing the pins 87 to be bodily projected above the plate 78 into engagement with the hair side of the fur, thereby yieldably urging the skin side firmly against the bottom 102 of the flange or shelf 100, holding the fur in such position while the cutter bar 4 is lowered to project the cutting instrumentalities C through the slot 101 in the performance of the cutting operation. Inasmuch as the pins 87 are yieldable independently of each other, the clamping operation will not be affected by variations in thickness of the fur. Moreover, due to the arrangement above described, the hairs of the fur will not be crushed by the clamping action or otherwise distorted in such a way as to cause the same to be cut or damaged by the cutting instrumentalities.

*Clamping mechanism drive*

It will be clear from the foregoing that the clamping instrumentalities B are actuated in timed relation to both the feeding instrumentalities and the cutting instrumentalities. The actuating means will now be described in detail, and reference will be particularly made to Figures 2, 11 and 12. Fixed to the main power shaft 13 is a cam wheel 103, having a cam groove 104 in one side thereof. The groove 104 may be formed by constructing the cam wheel 103 in two parts, one concentrically disposed within the other and fixed together, as by welding, to provide a unitary construction. A fiber or other suitable filler segment 105 may be disposed within the groove formed between the parts to give to the groove the desired eccentric shape. It is to be understood, however, that this construction may be modified as preferred. Disposed in the groove 104 is a roller or cam follower 106 rotatably mounted on a pin 107 projecting laterally from a plunger 108, the upper end of which is bifurcated at 109 and straddles the shaft 13. The plunger 108 is reciprocally mounted in a standard comprising a lower tubular part 110 fixed by screws 111 to the bed or base 1 of the machine. Mounted on the upper end of the part 110, and having a telescopic fit therein, is a guide 112 which extends upwardly to the shaft 13 and having a bearing 113 embracing the shaft 13 and in which the latter is free to rotate. The guide 112 is secured to the part 110 by the set-screw 114, and thus may be said to form a part of the standard. The lower end of the plunger 108 is threaded at 115 and is adjustably secured to the upper end of an internally threaded sleeve 116, the lower end of which is threaded onto an eye-bolt 117. Nuts 118, 119 serve to lock the plunger 108 and eye-bolt 117, respectively, to the sleeve 116 when the latter is adjusted to attain the desired spacing of the eye-bolt 117 respecting the plunger 108, the latter functioning with the eye-bolt 117 as a unitary assembly through means of the interconnecting sleeve 116.

Pivotally connected at 120 to the lower end of the eye-bolt 117 is a short link 121, the link also being pivotally connected at 122 to one arm 123 of a rocker lever, generally designated 124. The rocker 124 is pivoted at 125 for oscillating movement thereabout responsive to reciprocation of the plunger 108 incident to rotation of the cam wheel 103, and the rocker 124 is extended at the opposite side of the pivot 125 to provide an arm 126 which is pivotally connected at 127 to a link 128, the latter being also pivotally connected at 129 to the bottom of the carrier 83 of the clamping instrumentalities B. A spring 130 has one of its ends connected at 131 to a convenient fixed point on the base 1, and the other end of the spring is connected at 132 to an extension 133 of the arm 123, the spring normally serving to urge the rocker 124 to a position causing the carrier 83 to be lowered with the pins 87 retracted below the upper surface of the plate 78. Obviously, as the cam wheel 103 rotates, the pins 87 will be intermittently projected and retracted to and from their yieldable fur clamping position previously described, and it is to be understood that the cam slot 104 is so shaped as to cause the reciprocation of the clamping instrumentalities B in such timed relation that the clamping action takes place while the feed rolls and fur are stationary, and also maintaining the clamping action for a predetermined length of time while the cutting instrumentalties C are performing their cutting operation. Upon completion of the cut on each down stroke of the cutting instrumentalities C, and at a predetermined time before the feeding mechanism is actuated to advance the fur another step, the carrier 83 of the clamping mechanism B is lowered to retract the pins 87 below the upper side of the plate 78 to eliminate any drag of the fur on the pins.

Provision is also preferably made for adjusting the rocker lever 124 in an upward and downward direction. For this purpose, the pivot 125 is carried by a yoke 134 which is slidably engaged at its opposite sides with the spaced vertical guides 135, 135 of a bracket, generally designated 136, secured to the bottom of the base or bed 1 by bolts 137. An adjusting screw 138 is threadedly mounted in the bottom of the bracket 136 and normally abuts against the bottom of the yoke 134, as clearly shown in Figures 2 and 19. The upper side of the screw head 139 is preferably roughened or notched and coacts with a spring-pressed detent 140 which is slidable in a socket 141 in the bottom of the bracket 136. A spring 142 yieldingly presses the detent 140 into firm engagement with the head 139 of the screw 138, thereby maintaining the screw 138 in any position of adjustment after the adjustment has been made. Seated in a socket 143 in the lower side of the base or bed 1 is a spring 144 which abuts the upper side of the yoke 134, said spring normally yieldably urging the yoke 134 in a downward direction against the upper end of the adjusting screw 138. By rotating the screw 138 in one direction, the yoke 134 will be raised, thereby raising the rocker 124 to increase the effective clamping pressure exerted by the pins 87 against the fur during the clamping operation. Rotation of the screw 138 in the opposite direction serves to lower the rocker 124, thereby reducing the effective clamping pressure of the pins 187 during the clamping operation. By virtue of this adjustment just described, the machine can be conveniently and quickly adjusted to afford the preferred clamping pressure for different thicknesses of fur, while the independent yieldable mounting of the respective pins 87 automatically compensates for minor variations in thickness at different places in the same or different pieces of fur.

*Cutting mechanism*

Passing now to the cutting mechanism, and referring particularly to Figures 21 to 25, inclusive, I preferably provide the lower end of the cutter bar 4 with a head, generally designated 145, which is flat on two sides, as at 146, 147, said flat sides being vertically disposed and arranged at approximately a right angle to each other. The cutting instrumentalities C are composed of a pair of complemental flat cutter blades 148, 149, each blade having a flat shank 150, 151, respectively, adapted to lie against the respective flat sides 146 and 147 of the cutter bar head 145. The blade 148 is beveled at 152 along one vertical edge, and the blade 149 is complementarily beveled at 153, so that in assembling the blades on the head 145 the same may be disposed with the bevels 152, 153 in abutting engagement at the line of intersection of the flat sides 146, 147 of the head 145. The inclined cutting edges 154, 155 of the respective blades 148, 149 are so formed that the point 156 of the blade 149 is located in the vertical plane of the intersection of the blades, thus registering with the apex of the V-shaped slots 101 and 81 in the bottom of the guard 91 and the plate 78, respectively, when assembled on the cutter bar. The point 157 of the other blade 148 is so disposed as to lie in the vertical plane of the base of the slots 101, 81, aforesaid. Due to this arrangement of the cutting edges and points of the respective blades, the cutting action of one blade is progressively towards the apex of the V-shaped cut, while the cutting action of the companion blade progresses away from the apex of the cut. This produces a clean and accurate V-shaped cut without likelihood of tearing the skin of the fur, and materially contributes to the uniformity of the zig-zag or serrated cut, and the accurate juncture of the successive cuts during the step-by-step feed of the fur through the machine to produce a continuous zig-zag cut. Notches 158 and 159 are preferably formed in the contiguous edges of the respective cutter blades 148, 149 so that when the cutters are assembled on the head of the cutter bar, the notches form an opening 160, as shown in Figure 24 so that loose particles or hairs will not wedge between the cutter blades and spread the cutter blades at the joint.

The cutter blades are preferably removably mounted on the head 145 by means of a holder having the form of a collar 161 extending about the shanks of the cutter blades and the head 145, as clearly shown in Figure 23. A set-screw 162 extends through the holding collar 161 so that its inner end may be screwed against the head 146 to fasten the holding collar against displacement from the head while permitting convenient removal of the blades through loosening of the set-screw. Gibs 163, 164 cooperating with the respective set-screws 165, 166 serve to releasably secure the cutter blades in the holder collar 161, as will be obvious from the drawings, and retainer plates 167 are removably fastened by screws 168 to the upper and lower sides of the holding collar 161 to prevent accidental displacement of the gibs 163, 164. The bevels 152, 153 on the respective cutter blades 148, 149 are preferably inclined from the vertical, as clearly shown in Figure 25, at least along the shanks of the cutter blades so that the shank of each blade tapers narrower from bottom to top. I have found that such an arrangement produces a better clamping action on the cutters, and minimizes spreading of the cutters.

By virtue of the cutter assembly above described, the cutter blades can be readily and conveniently removed for sharpening or replacement. Obviously, by making the pairs of cutter blades in different sizes and interchanging the blades, different sizes of cuts may be produced by the same machine. In changing from one size cutter to another, the feeding mechanism must be adjusted accordingly, and such adjustment is facilitated by reference by the graduated scale 77 hereinbefore referred to in connection with the one-way clutch instrumentalities illustrated in Figures 6 to 10 inclusive.

*Cutter drive*

Reciprocation of the cutter bar 4 is produced by means which will now be described. Referring to Figure 2, it will be seen that the cutter bar 4 is guided at vertically spaced points in the upper and lower parts of the head 3 of the frame. Upper and lower bushings 169, 170 are preferably provided in the head 3 to reduce wear and maintain perfect alignment of the cutter bar during its reciprocation. Adjustably mounted on the cutter bar by means of a set-screw 171 is a block 172 having a channel 173 formed therein and extending horizontally at opposite sides of the cutter bar 4 and disposed normal to the axis of the cutter bar. Disposed in said channel 173 is a slide block 174 journaled on a pin 175 carried by a disc 176 fixedly mounted on the end of the main power shaft 13 opposite to the handwheel 15, and disposed within the head 3. As the shaft 13 is continuously rotated through its sprocket and chain connection with the drive shaft 8, the rotary motion is converted into reciprocal movement of the cutter bar 4. The reciprocation is so timed that the cutting instrumentalities C do not engage the fur during the downward travel of the cutter bar 4 and the cutter blades mounted on the lower end thereof, until the fur has been moved by the feeding mechanism to the proper position therebelow and clamped in such position, and the feeding rolls and clamping members are at rest. As soon as the cutter blades penetrate through the skin, the cutter bar begins to rise, and when the cutter blades have been completely disengaged from the skin of the fur, which skin is disposed uppermost as the fur is fed through the machine, the clamping instrumentalities release the fur to condition the same for the next feeding step which is imparted by the feed rolls after the pins 87 have been retracted below the upper side of the plate 78 to clear the space between the bottom 102 of the guard 91 and the upper side of the plate 78. The cycle of operations is then repeated in a manner which will be clear from the foregoing description, until the zig-zag cut produced by the successive cutting steps has reached the end of the fur, or any point short of the end, whichever is preferred. Thereupon, rotation of the drive shaft 8 is discontinued in any suitable manner, as by shutting off the electric motor through means of a suitable control switch 170 actuated by a pedal 171, where the machine is driven by an electric motor, or otherwise interrupting the transmission between the prime mover and the drive shaft 8.

It is to be understood that although the machine hereinbefore described has been designed primarily for use in cutting fur, it is not necessarily limited to such material, but may be also used for cutting other materials having tufted, napped, or pile surfaces, as well as ordinary sheet materials.

While the specific details have been herein shown and described, the invention is not confined thereto, as changes and alterations may be made without departing from the spirit thereof as defined by the appended claims.

Having thus described my invention, what I claim as new and desire to secure by Letters Patent is—

1. In a machine of the class described, in combination, a support, cutting instrumentalities reciprocally mounted thereon, and work clamping instrumentalities also mounted on said support and including a reciprocal pressure member disposed in opposed relation to the cutting instrumentalities aforesaid, said pressure member including a plurality of spaced pins arranged contiguous to the line of cut produced by the cutting instrumentalities, each pin being yieldably mounted independently of the others.

2. In a machine of the class described, in combination, a support, cutting instrumentalities reciprocally mounted thereon, and work clamping instrumentalities also mounted on said support and including a fixed part having an opening therein through which the cutting instrumentalities may pass during reciprocation of the latter, a reciprocal pressure member disposed below and in opposed relation to the fixed part and cutting instrumentalities aforesaid, said pressure member including a plurality of spaced pins arranged contiguous to the line of cut produced by the cutting instrumentalities, and engageable with the work from beneath, and another fixed part disposed in spaced relation to and below the first fixed part and having apertures therein through which the pins are alternately projected and retracted to positions disposing the free extremities of the pins respectively above and below the upper side of the second fixed part during reciprocation of the reciprocal pressure member.

3. In a machine of the class described, in combination, a support, cutting instrumentalities reciprocally mounted thereon, work clamping instrumentalities also mounted on said support and including a reciprocal pressure member disposed opposite to and movable in an opposite direction to and in timed relation with the cutting instrumentalities aforesaid, and means for varying the effective pressure of the pressure member, said last named means including a rocker member operatively connected to the pressure member and having its rocking axis adjustable in the direction of reciprocal movement of the pressure member.

4. In a machine of the class described, in combination, a support, cutting instrumentalities reciprocally mounted thereon, and work clamping instrumentalities also mounted on said support and including a reciprocal pressure member disposed in opposed relation to the cutting instrumentalities aforesaid, said pressure member including means for applying independently yieldable pressure to the work at a plurality of spaced points in zones contiguous to the line of cut.

5. In a machine of the class described, in combination, a support, cutting instrumentalities reciprocally mounted thereon, work clamping instrumentalities also mounted on said support and including a reciprocal pressure member disposed in opposed relation to the cutting instrumentalities aforesaid, and power operated means for actuating the cutting and clamping instrumentalities in timed relation to each other, said last named means including a power shaft rotatably mounted on the support, a cam mounted on the power shaft, a rocker lever pivotally mounted on the support, said rocker lever being operable by the cam aforesaid and operatively connected to the reciprocal pressure member of the clamping instrumentalities, and means for adjusting the position of the pivotal axis of said rocker lever.

6. In a machine of the class described, in combination, a support, cutting instrumentalities reciprocally mounted thereon, work clamping instrumentalities also mounted on said support and including a reciprocal pressure member disposed in opposed relation to the cutting instrumentalities aforesaid, and power operated means for actuating the cutting and clamping instrumentalities in timed relation to each other, said last named means including a power shaft rotatably mounted on the support, a cam mounted on the power shaft, a rocker lever pivotally mounted on the support, said rocker lever being operable by the cam aforesaid and operatively connected to the reciprocal pressure member of the clamping instrumentalities, and means for adjusting the position of the pivotal axis of said rocker lever, said last named means comprising a yoke rockably supporting the rocker lever, a bracket mounted on the support and slidably engaging the yoke for limited relative movement therebetween in a direction normal to the pivotal axis of the rocker lever, and means for effecting sliding adjustment of the yoke respecting the bracket.

7. In a machine of the class described, in combination, a support, cutting instrumentalities reciprocally mounted thereon, work clamping instrumentalities also mounted on said support and including a reciprocal pressure member disposed in opposed relation to the cutting instrumentalities aforesaid, and power operated means for actuating the cutting and clamping instrumentalities in timed relation to each other, said last named means including a power shaft rotatably mounted on the support, a cam mounted on the power shaft, a rocker lever pivotally mounted on the support, said rocker lever being operable by the cam aforesaid and operatively connected to the reciprocal pressure member of the clamping instrumentalities, and means for adjusting the position of the pivotal axis of said rocker lever, said last named means comprising a yoke rockably supporting the rocker lever, a bracket mounted on the support and slidably engaging the yoke for limited relative movement therebetween in a direction normal to the pivotal axis of the rocker lever, yieldable means acting upon one side of the yoke to normally urge the same in one direction in the bracket, and an adjusting screw carried by the bracket and operatively engaging the opposite side of the yoke.

8. In a machine of the class described, in combination, a support, cutting instrumentalities reciprocally mounted thereon, and work feeding instrumentalities also mounted on said support and intermittently operable in timed relation to the cutting instrumentalities aforesaid, said work feeding instrumentalities including superposed pairs of feed rolls disposed at one side of said cutting instrumentalities, the rolls of each pair being spaced at different distances from the cutting instrumentalities and in alignment with the corresponding rolls of the other pair, and means for positively intermittently rotating said feed rolls in opposite directions.

9. In a machine of the class described, in combination, a support, cutting instrumentalities reciprocally mounted thereon, and work feeding instrumentalities also mounted on said support and intermittently operable in timed relation to the cutting instrumentalities aforesaid, said work feeding instrumentalities including superposed feed rolls disposed at one side of said cutting instrumentalities, and means for positively intermittently rotating said feed rolls in opposite directions, said last named means including one-way clutch means common to both feed rolls, a gear train interposed between said one-way clutch means and one of said feed rolls, and locking instrumentalities associated with said latter feed roll for restraining said feed roll against rotation in the direction opposite to the normal direction of rotation produced by the one-way clutch means.

10. In a machine of the class described, in combination, a support, cutting instrumentalities reciprocally mounted thereon, a plurality of cooperative feed rolls also mounted on said support at one side of said cutting instrumentalities, a power shaft rotatably mounted on said support, a second shaft disposed parallel to the first shaft and operatively connected to the respective feed rolls, and one-way clutch means interposed between said power shaft and said second shaft and intermittently operable by the power shaft.

11. In a machine of the class described, in combination, a support, cutting instrumentalities reciprocally mounted thereon, a plurality of cooperative feed rolls also mounted on said support at one side of said cutting instrumentalities, a power shaft rotatably mounted on said support, a second shaft disposed parallel to the first shaft and operatively connected to the respective feed rolls, and one-way clutch means interposed between said power shaft and said second shaft and intermittently operable by the power shaft, said last named means including a cam operable by the power shaft, an actuating lever pivotally mounted on the support and coacting with the cam, a slotted link operatively connected to said pivotal lever and oscillatable thereby about the axis of the second shaft, an annular member fixed to said slotted link for oscillation therewith, a disc fixed to said second shaft and disposed within the annular member, said disc having recesses each of varying depth in the periphery thereof, and roller members disposed in said recesses and interposed between the disc and the annular member whereby to automatically effect clutching engagement of said annular member with said disc to rotate said second shaft in one direction responsive to actuation of the slotted link and annular member in one direction, and to automatically release the annular member from the disc to permit actuation of the slotted link and annular member in the opposite direction without imparting movement to the second shaft.

12. In a machine of the class described, in combination, a support, cutting instrumentalities reciprocally mounted thereon, a plurality of cooperative feed rolls also mounted on said support at one side of said cutting instrumentalities, a power shaft rotatably mounted on said support, a second shaft disposed parallel to the first shaft and operatively connected to the respective feed rolls, and one-way clutch means interposed between said power shaft and said second shaft and intermittently operable by the power shaft, said last named means including a cam operable by the power shaft, an actuating lever pivotally mounted on the support and coacting with the cam, a slotted link operatively connected to said pivotal lever and oscillatable thereby about the axis of the second shaft, an annular member fixed to said slotted link for oscillation therewith, a disc fixed to said second shaft and disposed within the annular member, said disc having recesses each of varying depth in the periphery thereof, and roller members disposed in said recesses and interposed between the disc and the annular member whereby to automatically effect clutching engagement of said annular member with said disc to rotate said second shaft in one direction responsive to actuation of the slotted link and annular member in one direction, and to automatically release the annular member from the disc to permit actuation of the slotted link and annular member in the opposite direction without imparting movement to the second shaft, and means also associated with said second shaft for positively restraining the latter against movement during actuation of the slotted link and annular member in the last mentioned direction.

13. In a machine of the class described, in combination, a support, cutting instrumentalities reciprocally mounted thereon, a plurality of cooperative feed rolls also mounted on said support at one side of said cutting instrumentalities, a power shaft rotatably mounted on said support, a second shaft disposed parallel to the first shaft and operatively connected to the respective feed rolls, and one-way clutch means interposed between said power shaft and said second shaft and intermittently operable by the power shaft, said last named means including a cam operable by the power shaft, an actuating lever pivotally mounted on the support and coacting with the cam, a slotted link operatively connected to said pivotal lever and oscillatable thereby about the axis of the second shaft, an annular member adjustably fixed to said slotted link for oscillation therewith, a disc fixed to said second shaft and disposed within the annular member, said disc having recesses each of varying depth in the periphery thereof, and roller members disposed in said recesses and interposed between the disc and the annular member whereby to automatically effect clutching engagement of said annular member with said disc to rotate said second shaft in one direction responsive to actuation of the slotted link and annular member in one direction, and to automatically release the annular member from the disc to permit actuation of the slotted link and annular member in the opposite direction without imparting movement to the second shaft.

14. In a machine of the class described, in combination, a support, cutting instrumentalities reciprocally mounted thereon, a plurality of cooperative feed rolls also mounted on said support at one side of said cutting instrumentalities, a power shaft rotatably mounted on said support, a second shaft disposed parallel to the first shaft and operatively connected to the respective feed rolls, and one-way clutch means interposed between said power shaft and said second shaft and intermittently operable by the power shaft, said last named means including a slotted link oscillatable about the axis of the second shaft, an annular member fixed to said slotted link for oscillation therewith, a disc fixed to said second shaft and disposed within the annular member, said disc having recesses each of varying depth in the periphery thereof, and roller members disposed in said recesses and interposed between the disc and the annular member whereby to automatically effect clutching engagement of said annular member with said disc to rotate said second shaft in one direction responsive to actuation of the slotted link and annular member in one direction, and to automatically release the annular member from the disc to permit actuation of the slotted link and annular member in the opposite direction without imparting movement to the second shaft.

15. In a machine of the class described, in combination, a support, cutting instrumentalities reciprocally mounted thereon, work clamping instrumentalities also mounted on said support and including a fixed part having an opening therein through which the cutting instrumentalities may pass during reciprocation of the latter, a reciprocal pressure member disposed in opposed relation to the fixed part and cutting instrumentalities aforesaid and operable in timed relation thereto, and work feeding instrumentalities disposed at one side of said cutting and clamping instrumentalities and intermittently operable in timed relation to the cutting and clamping instrumentalities, said work feeding instrumentalities including coacting oppositely rotatable feed rolls mounted for relative yieldable movement towards and away from each other, one of said rolls having its axis fixed so as to dispose the periphery thereof at the point of contact with the work substantially in the plane of the fixed clamping part aforesaid.

16. In a machine of the class described, in combination, a support, cutting instrumentalities reciprocally mounted thereon and including a reciprocal cutter bar, said cutter bar having a head disposed at one end thereof and formed with two flat faces arranged in planes intersecting at approximately a right angle and substantially parallel to the axis thereof, a pair of flat elongated cutter blades, and means for releasably securing one end of each cutter blade in flat engagement with the respective flat faces of the cutter bar head, with one edge of one blade in close abutting engagement with an edge of the other blade, and the free ends of said blades being provided with cutting edges intersecting at approximately a right angle in a plane normal to the axis of reciprocation of the cutter bar, and means for reciprocating the cutter bar, said securing means including a collar member embracing the cutter bar head and the ends of the cutter blades opposite to the cutting edges.

17. A cutter for fur cutting machines of the class described, comprising a pair of elongated flat blades disposed in angular relation to each other and each having a longitudinally beveled edge in abutting contact, each of said blades also having an elongated notch formed in its longitudinally beveled edge, registering with the notch in the other blade and forming an elongated opening between the blades at the line of intersection, and each blade having an inclined cutting edge formed on its end, with the point of one cutting edge disposed in the vertical plane of the intersection of the blades, and the point of the cutting edge of the other blade disposed at a distance from the plane of intersection aforesaid.

18. A cutter blade for fur cutting machines of the class described, comprising an elongated flat blade having one of its longitudinal edges beveled and disposed at an inclination to the longitudinal axis of the blade, at least for a portion of the length of the blade, forming a tapered shank, and said blade having an inclined cutting edge formed on its end opposite to the shank aforesaid.

19. A cutter as claimed in claim 17, in combination with a holder comprising a collar extending about the ends of the blades opposite to their cutting edges, said collar having a pair of flat faces arranged in intersecting planes corresponding to the angular disposition of the blades and disposed for flat contact with the respective blades, and means on said collar for releasably urging the blades into edgewise contact with each other at their beveled edges.

20. A cutter as claimed in claim 17, in combination with a holder comprising a collar extending about the ends of the blades opposite to their cutting edges, said collar having a pair of flat faces arranged in intersecting planes corresponding to the angular disposition of the blades and disposed for flat contact with the respective blades, and means on said collar for releasably urging the blades into edgewise contact with each other at their beveled edges, said last named means including a pair of gibs engaging the longitudinal edges of the respective blades opposite to their beveled edges.

LOUIS ROTTER.